(12) United States Patent
Katariya (10) Patent No.: US 6,226,635 B1
(45) Date of Patent: May 1, 2001

(54) LAYERED QUERY MANAGEMENT

(75) Inventor: Sanjeev Katariya, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/133,976

(22) Filed: Aug. 14, 1998

(51) Int. Cl.[7] ........................................ G06F 17/30
(52) U.S. Cl. ........................................................ 707/4
(58) Field of Search ................................ 707/4, 5, 6, 3

(56) References Cited

U.S. PATENT DOCUMENTS

| | | | |
|---|---|---|---|
| 5,754,938 | * 5/1998 | Herz et al. | 455/4.2 |
| 5,778,356 | * 7/1998 | Heiny | 707/2 |
| 5,884,033 | * 3/1999 | Duvall et al. | 395/200.36 |
| 6,006,214 | * 12/1999 | Carey et al. | 707/2 |
| 6,049,821 | * 4/2000 | Therialut et al. | 709/203 |
| 6,065,055 | * 5/2000 | Hughes et al. | 709/229 |

* cited by examiner

*Primary Examiner*—Wayne Amsbury
(74) *Attorney, Agent, or Firm*—Woodcock Washburn Kurtz Mackiewicz & Norris LLP (57) ABSTRACT

The present invention provides a distributed software facility for tailoring an information retrieval query issued by a user based upon the position of that user within an organization of users. In a query client, the facility generates an information retrieval query on behalf of an identified user. The identified user is a member both of first logical subset of the organization and of a second logical subset of the organization. In a first proxy server corresponding to the first logical subset of the organization, the facility modifies the generated query based upon query modification criteria specified for members of the first logical subset. In a second proxy server corresponding to a second logical subset of the organization, the facility modifies the generated query based upon query modification criteria specified for members of the second logical subset. The facility then processes the query as modified by the first and second proxy servers to retrieve information responsive to the modified query.

48 Claims, 9 Drawing Sheets

| user | query | query result modification preference |
|---|---|---|
| MikeK | body configuration | \\design should modify |

600 — query data structure
601, 602, 603

*Fig. 6*

| user | query | query result modification preference |
|---|---|---|
| MikeK | Convertible body configuration | \\design should modify |

800 — modified query data structure
801, 804, 803

*Fig. 8* query modification table ⌐ 700

| users | query pattern | reject | modify |
|---|---|---|---|
| all | includes term "sex" | yes | |
| all | all | | add term "convertible" |
| all | all | | replace term "RWD" with "rear wheel drive" |
| all | includes term "sports" | | add query server http://www.sports.com |
| drafting group | all | yes | |

*Fig. 7* query result limitation table ⌐ 1000

| users | authorized columns |
|---|---|
| MikeK | web page reference, web page title, update date |

↖1001　　　　　　　　　　　　　↖1002

*Fig. 10* query result modification table ⌐ 1200

| users | query result pattern | modify |
|---|---|---|
| all | contains automotive web page references | add column of references to images for automotive web pages |

*Fig. 12* raw query result — 900

| web page reference | web page title | update date | cache identifier |
|---|---|---|---|
| http://www.convertibles.com | Convertible Club | 7/22/97 | 1625345 |
| http://www.classics.com | Classic Autos | 10/30/97 | 2233543 |
| http://www.motorworld.com | Motorworld Magazine | 1/25/98 | 2691387 |

901  902  903  904

*Fig. 9* limited query result — 1100

| web page reference | web page title | update date |
|---|---|---|
| http://www.convertibles.com | Convertible Club | 7/22/97 |
| http://www.classics.com | Classic Autos | 10/30/97 |
| http://www.motorworld.com | Motorworld Magazine | 1/25/98 |

*Fig. 11*

1300 — modified query result

| web page reference | web page title | update date | image reference |
|---|---|---|---|
| http://www.convertibles.com | Convertible Club | 7/22/97 | \\design\images\cc.jpg |
| http://www.classics.com | Classic Autos | 10/30/97 | \\design\images\classautos.jpg |
| http://www.motorworld.com | Motorworld Magazine | 1/25/98 | \\design\images\magazine.jpg |

LAYERED QUERY MANAGEMENT

TECHNICAL FIELD

The invention relates generally to the field of database and search queries, and, more specifically, to the field of architectures for performing the same.

BACKGROUND OF THE INVENTION

Fundamentally, retrieval queries ("queries") are requests for information. A query may be expressed using a formal query language such as SQL, or may take the form of a natural language question or an unorganized list of search terms. A query may further be represented by a "query object" containing data and/or instructions relating to the query.

Queries are said to be issued by programs called "query clients," often under the control of a human user. Such queries are said to be received and processed by other programs called "query servers." For a particular query, a query server generally consults one or more databases containing information that includes the information requested by the query, and returns the requested information to the query client from which the query was received in the form of a "query result." In some cases, the query result comprises a result table divided into rows and columns. Each result table row generally corresponds to a different item satisfying the query, while each column generally corresponds to one piece of information about each item. For example, a result table for a query requesting information on world wide web ("web") pages containing the word "ragtop" might contain 5 rows, each corresponding to a different web page containing "ragtop." The query result might further contain 3 columns: a first column containing a reference to the web page to which each row corresponds, a second column containing the title of the web page to which each row corresponds, and a third column containing the last date on which the web page to which each row corresponds was updated.

While query clients and query servers in some cases execute on the same computer systems, some query clients and query servers are designed to execute on different computer systems. Where a query client is executing on a computer system other than the computer system on which the query server is executing, the query client communicates the query to the query server via a data network connecting the query client and query server. The query may either be communicated directly from the query client to the query server, or it may be communicated indirectly through any number of intervening computer systems.

Even where the query is communicated indirectly through intervening computer systems, such intervening computer systems generally pass the query and resulting query result through intact, without modifying or filtering either the query or the query result. This querying model allows the user of the query client to exercise a large measure of autonomy in issuing queries and receiving their results.

The inventors have recognized significant disadvantages that attend the use of this model within certain organizations. First, in accordance with this model, organizations are unable to limit both the set of users that may issue queries and the kind of queries that may be issued and the results that may be received. Second, in accordance with this model, organizations are unable to assist users by tailoring the query or the query result based upon systematic factors relating to the organization or the user's position within it.

In view of these disadvantages, a new model for managing queries and query results within an organization would provide significant utility.

SUMMARY OF THE INVENTION

The present invention provides a distributed software facility for layered query management. The present invention is directed to a layered architecture for managing database queries, such as queries to a web search engine, within an organization. This layered architecture facilitates tailoring queries and their results based on the position within the organization of the users issuing the queries. For example, the facility may add the search term "convertible" to queries issued by an employee working to design open-top roadsters for an automobile company in order to add an appropriate context to such queries. Further, the facility may modify query results that refer to various automotive publications for all users in the automobile company to include images identifying the automotive publications in the query result. Additionally, the facility may add or remove query servers based on the nature of the query. Where multiple query servers are specified for a query, the facility further preferably collates the results from the different query servers into a single query result.

In accordance with the invention, one or more proxy servers are interposed between a query client that issues queries and a query server running a search engine that satisfies queries. Each proxy server preferably corresponds to a meaningful organizational group of users. For example, queries issued by employees in a group working on open-top roadsters in the design division of an automobile company may be processed by a sequence of three proxy servers: a first proxy server that processes queries from all of the employees in the group, a second proxy server that processes queries from all of the employees in the division, and a third proxy server that processes queries from all of the employees in the company.

In accordance with the architecture, each layer may exert control over the query and its query result. The user first generates the query in the query client which forwards the query to an upstream proxy server. Each upstream proxy server in turn forwards the query to a further upstream proxy server, until the last upstream proxy server forwards the query to a query server. The query server uses a search engine to satisfy the query, then forwards it back to the query client via the proxy server. Each proxy server may prevent all query submissions from a particular client or user, perform screening to reject queries having certain content, and modify certain queries. As examples of modifications, the proxy servers may add information to the queries, delete information from the queries, or substitute information in the queries. The proxy servers may also add or remove query servers to and from the list of query servers specified for a query. Because such modifications may be performed differently in each proxy server corresponding to a different subset of the organization, administrators may straightforwardly target modification initiatives to appropriate subsets of the organization.

After performing the query to generate a query result, the query server may remove certain columns from the query result based on the security level of the user issuing the query. When each proxy server receives the query result on its way back to the query client, the proxy server may modify the query result based both on the identity of the user/client and the contents of the query result. For example, the proxy server may add columns containing additional information about the rows of the query result, delete rows containing a forbidden term, or modify the query result to highlight dates. When formulating the query in the query client, the user can suggest which of the proxy servers should modify the query result.

DETAILED DESCRIPTION OF THE INVENTION

The present invention provides a distributed software facility for layered query management. The present invention is directed to a layered architecture for managing database queries, such as queries to a web search engine, within an organization. This layered architecture facilitates tailoring queries and their results based on the position within the organization of the users issuing the queries. For example, the facility may add the search term "convertible" to queries issued by an employee working to design open-top roadsters for an automobile company in order to add an appropriate context to such queries. Further, the facility may modify query results that refer to various automotive publications for all users in the automobile company to include images identifying the automotive publications in the query result. Additionally, the facility may add or remove query servers based on the nature of the query. Where multiple query servers are specified for a query, the facility further preferably collates the results from the different query servers into a single query result.

In accordance with the invention, one or more proxy servers are interposed between a query client that issues queries and a query server running a search engine that satisfies queries. Each proxy server preferably corresponds to a meaningful organizational group of users. For example, queries issued by employees in a group working on open-top roadsters in the design division of an automobile company may be processed by a sequence of three proxy servers: a first proxy server that processes queries from all of the employees in the group, a second proxy server that processes queries from all of the employees in the division, and a third proxy server that processes queries from all of the employees in the company.

In accordance with the architecture, each layer may exert control over the query and its query result. The user first generates the query in the query client which forwards the query to an upstream proxy server. Each upstream proxy server in turn forwards the query to a further upstream proxy server, until the last upstream proxy server forwards the query to a query server. The query server uses a search engine to satisfy the query, then forwards it back to the query client via the proxy server. Each proxy server may prevent all query submissions from a particular client or user, perform screening to reject queries having certain content, and modify certain queries. As examples of modifications, the proxy servers may add information to the queries, delete information from the queries, or substitute information in the queries. The proxy servers may also add or remove query servers to and from the list of query servers specified for a query. Because such modifications may be performed differently in each proxy server corresponding to a different subset of the organization, administrators may straightforwardly target modification initiatives to appropriate subsets of the organization.

After performing the query to generate a query result, the query server may remove certain columns from the query result based on the security level of the user issuing the query. When each proxy server receives the query result on its way back to the query client, the proxy server may modify the query result based both on the identity of the user/client and the contents of the query result. For example, the proxy server may add columns containing additional information about the rows of the query result, delete rows containing a forbidden term, or modify the query result to highlight dates. When formulating the query in the query client, the user can suggest which of the proxy servers should modify the query result.

Figure 1:
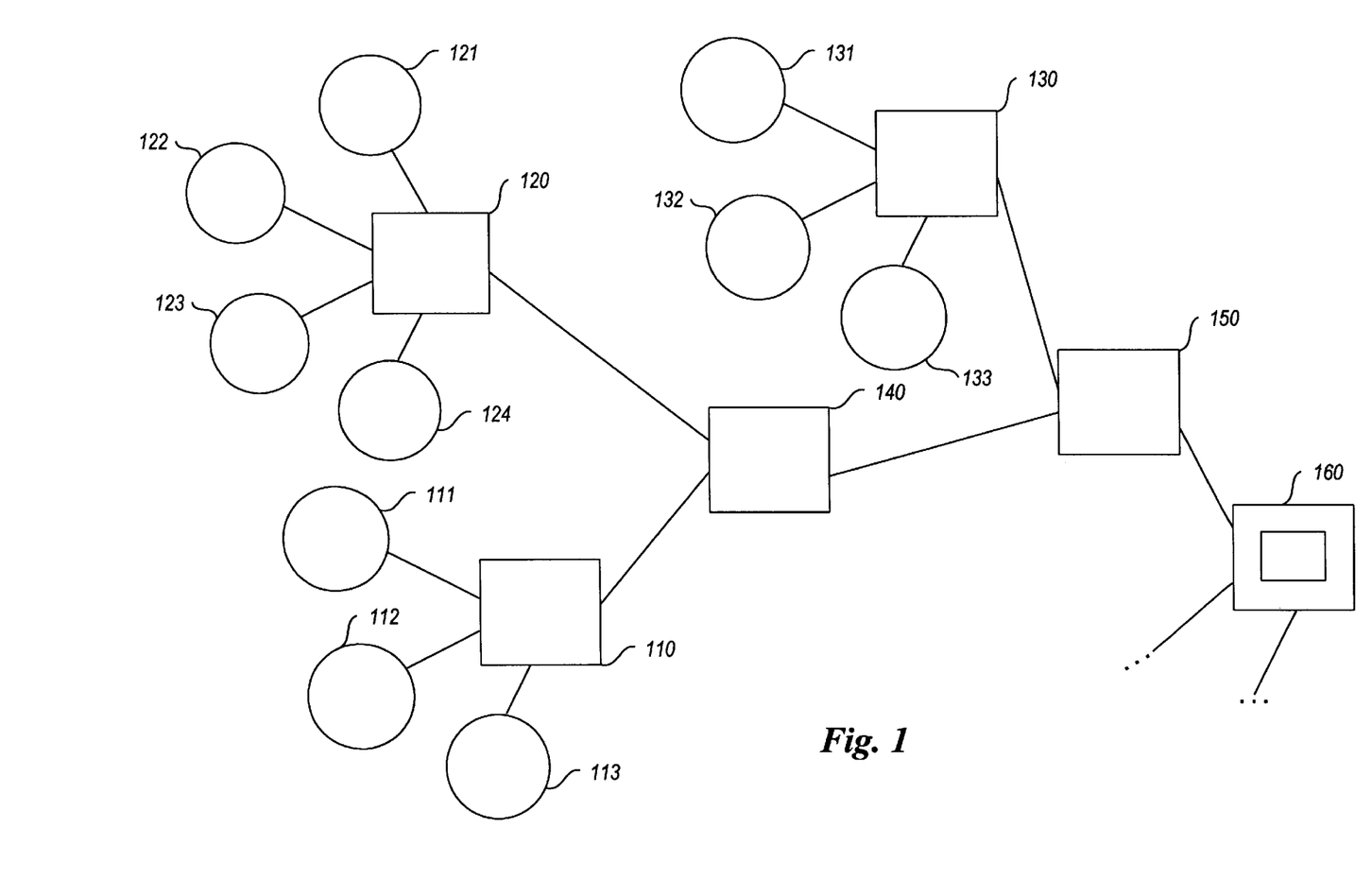
FIG. 1 is an architecture diagram showing a typical configuration of query clients, proxy servers, and query servers.

FIG. 1 is an architecture diagram showing a typical configuration of query clients, proxy servers, and query servers. Such a configuration would be appropriate for, for example, a portion of an automobile company. Query clients 111–113 (each shown as a circle) are preferably used by users in the design department of the automobile company that are working on an open-top roadster project. These three query clients are connected to a proxy server 110 (shown as a square) corresponding to the roadster project. Query clients 121–124 are used by users in the design department working on a sedan project, and are connected to a proxy server 120 corresponding to the sedan project. Both proxy server 110, corresponding to the roadster project, and proxy server 120, corresponding to the sedan project, are in turn connected to proxy server 140 corresponding to the design division. Query clients 131–133 are used by users in the management group of the automobile company, and are each connected to proxy server 130 corresponding to the management group. Proxy servers 130 and 140 are in turn connected to proxy server 150 which corresponds to the automobile company as a whole. Proxy server 150 is in turn connected to a query server 160 (shown as a double square). Queries are generated by users in the query clients, and transmitted via any intervening proxy servers to the query server for processing. For example, a query generated in query client 112 by a member of the roadster project would be passed first to proxy server 110, then to proxy server 140, then to proxy server 150, then to query server 160 for processing. In each of these three proxy servers, the facility may modify the query in accordance with the subset of the car company organization to which the proxy server corresponds. That is, proxy server 110 could modify such a query based on the needs of users working on the roadster project, proxy server 140 could modify the query based on the needs of members of the design division, and proxy server 150 could modify the query based on the needs of users within the automobile corporation. In each proxy server, such modifications to the query may be made to all queries, or only to selected queries based on the identity of the user and/or the content of the query.

In the query server 160, the query is processed in order to generate information representing a query result. The query server preferably limits the information contained in this query result to exclude any information that the user is not authorized to receive. This limited query result is then returned to the query client that submitted the query via the same intervening proxy clients, in this case proxy clients 150, 140, and 110. Each of the proxy servers may modify the query result to add, remove, or modify information within the query result. Again, such modification is preferably made in the proxy servers based upon the portion of the organization represented by each proxy server. That is, proxy server 150 may modify the query result based on needs of users throughout the automobile company, proxy server 140 may modify the query result based on needs of the design division, and proxy server 110 may modify the query result based on needs of the roadster team. Finally, the modified query results are received in the originating query client 112 and displayed.

If the query server 160 is outside of the organization (For example, the organization may connect to the query server 160 via the Internet.), the computer system executing proxy server 150 may also execute firewall software to ensure the safety of information entering and leaving the organization. On the other hand, the query server 160 may be within the organization. The facility is adapted to use more then one query server to satisfy queries. Additional query servers may be connected to proxy server 150. Alternatively, the organization may establish proxy servers on a one-to-one basis with multiple query servers, so that query and query result modification may be conducted on a per-query server basis. Alternatively, different query modification tables and query result modification tables each corresponding to a different query server may be used by a single top-level proxy server such as proxy server 150 in order to conduct query and query result modification on a per-query server basis.

In some embodiments, the facility may manage queries and their results for only a portion of the user's organization. In additional embodiments, the facility may manage queries for users in multiple organizations.

Figure 2:
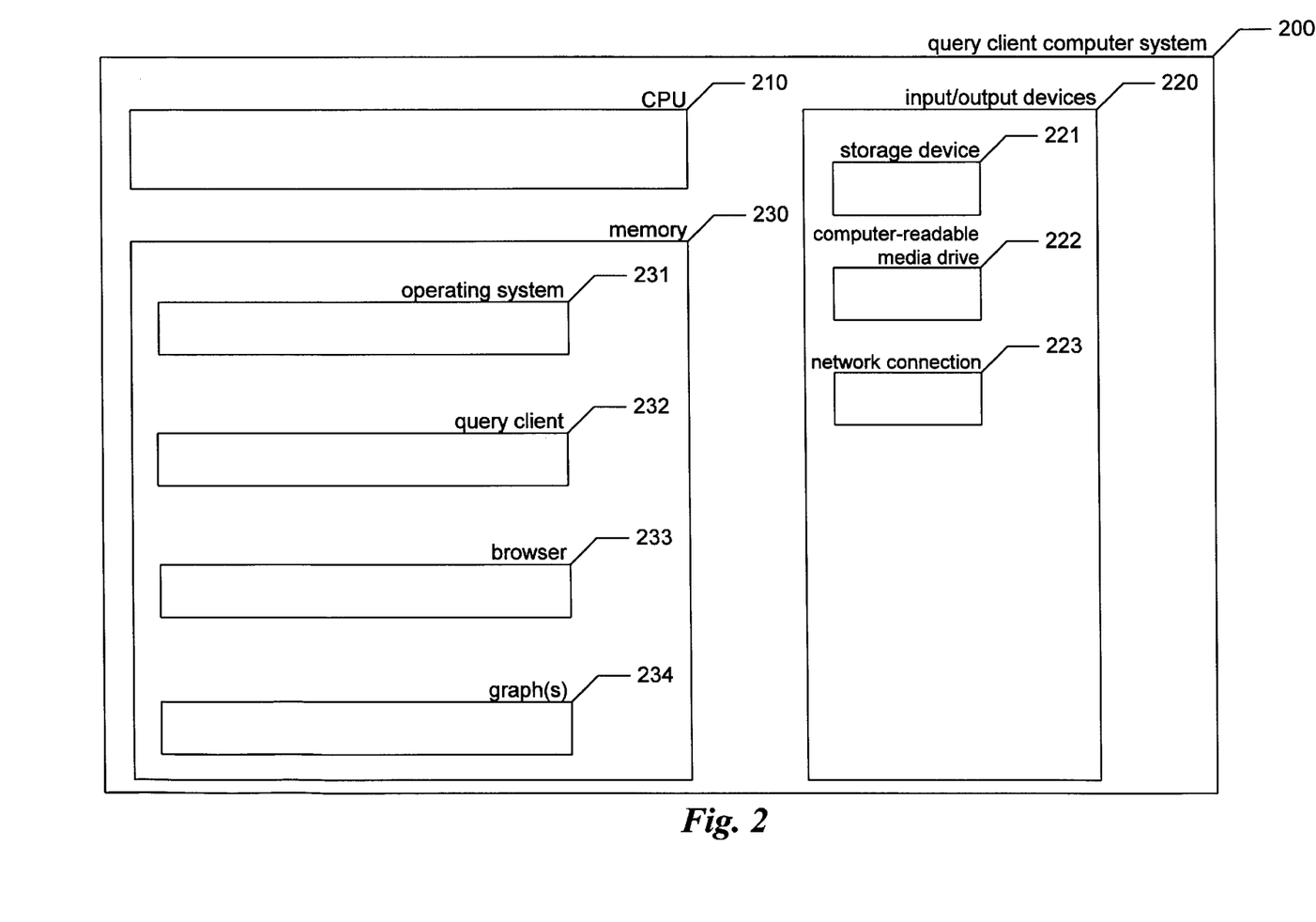
FIG. 2 is a high-level block diagram of the general-purpose computer system that preferably comprises a representative one of the query client computer systems.

FIG. 2 is a high-level block diagram of the general-purpose computer system that preferably comprises a representative one of the query client computer systems. The query client computer system 200 contains a central processing unit (CPU) 210, input/output devices 220, and a computer memory (memory) 230. Among the input/output devices is a storage device 221, such as a hard disk drive, and a computer-readable media drive 222, which can be used to install software products, including components of the facility, which are provided on a computer-readable medium, such as a CD-ROM. The input/output devices also include a network connection 223, through which the computer system 200 may communicate with other connected computer systems. The memory 230 preferably contains an operating system, such as MICROSOFT® WINDOWS® 98 or WINDOWS NT®, for providing to other programs access to resources of the computer system. The memory 230 preferably further contains a query client computer program 232 for generating and submitting queries under user control, and receiving and displaying the results of such queries. The memory 230 preferably also contains a browser 233 in one or more applications 234, which may also generate queries that are transmitted to a proxy server either directly or via the query client 232.

Figure 3:
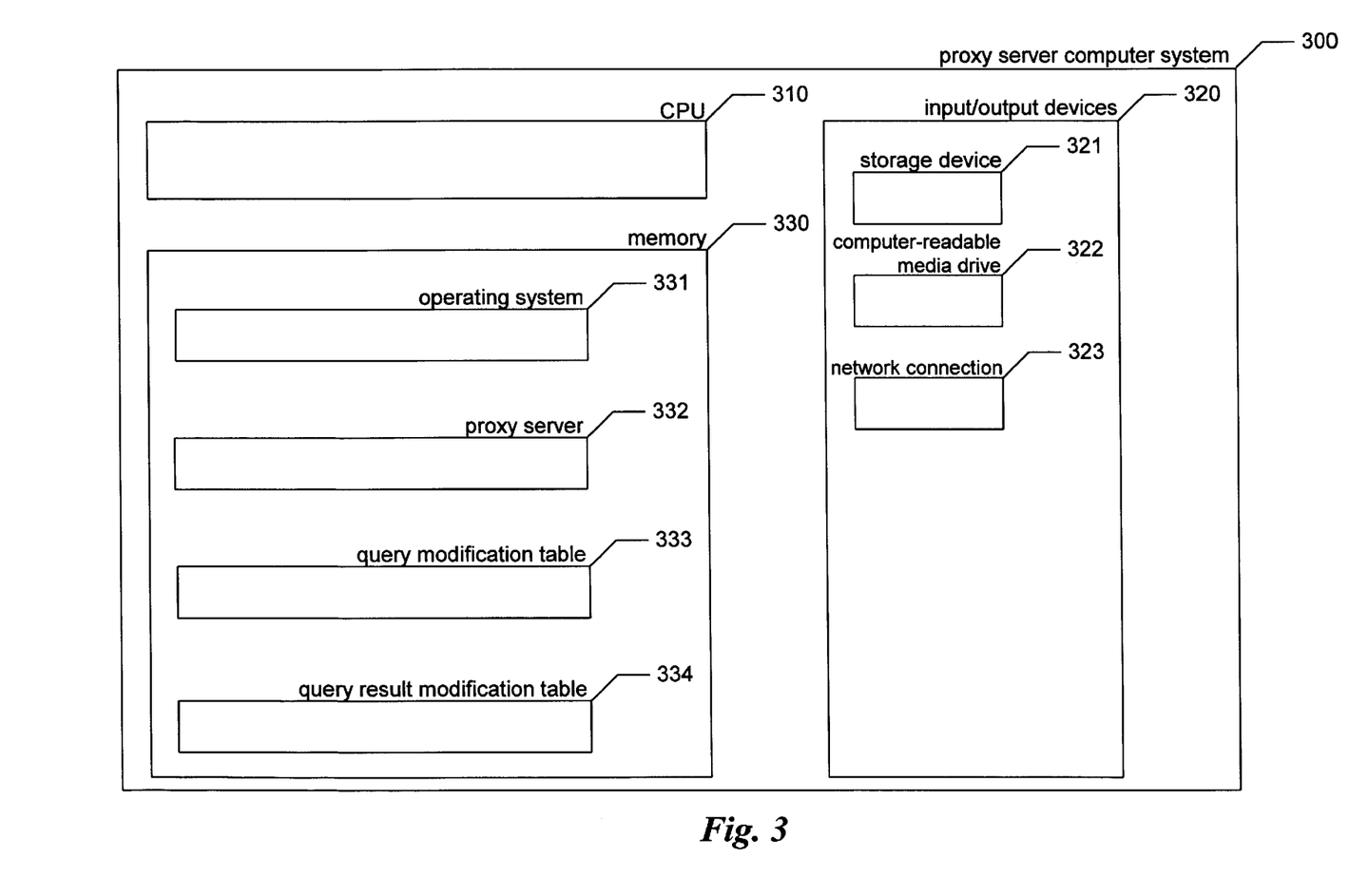
FIG. 3 is a high-level block diagram of the general-purpose computer system that preferably comprises a representative one of the proxy server computer systems.

FIG. 3 is a high-level block diagram of the general-purpose computer system that preferably comprises a representative one of the proxy server computer systems. The proxy server computer system 300 is similar to the query client computer system 200 described above. Its memory 330, however, contains the proxy server computer program 332 for modifying queries and their results passing between the query client and the query server. The memory 330 further contains a query modification table 333 used by the proxy server to determine how to modify queries, and a query result modification table 334 used by the proxy server to determine how to modify query results. The memory 330 preferably further includes an operating system 331, such as MICROSOFT® WINDOWS NT®, for providing to other programs access to resources of the computer system.

Figure 4:
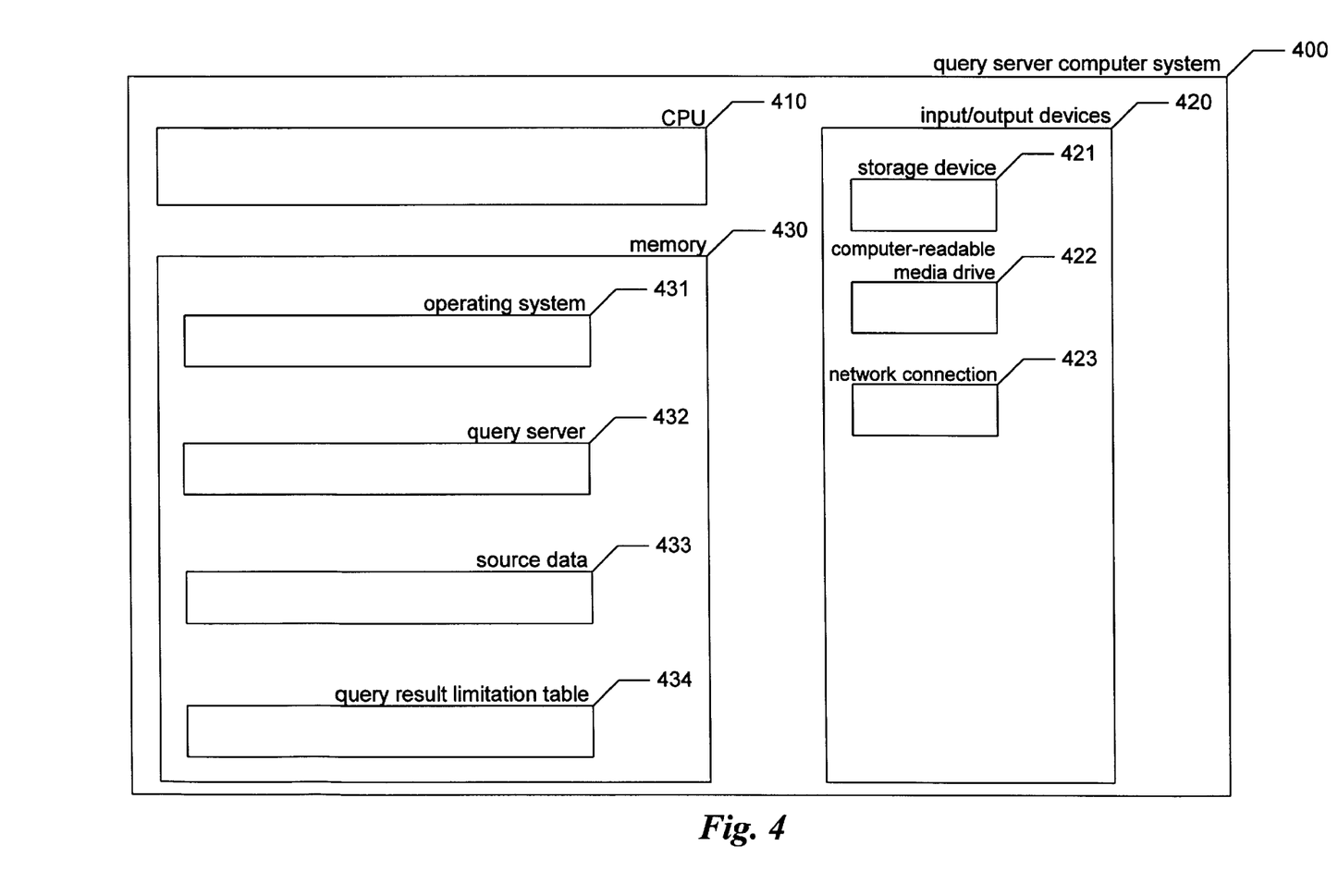
FIG. 4 is a high-level block diagram of the general-purpose computer system that preferably comprises a representative query server computer system.

FIG. 4 is a high-level block diagram of the general-purpose computer system that preferably comprises a representative query server computer system. The query server computer system 400 is similar to the query client computer system 200 and proxy server computer system 300 described above. Its memory 430, however, contains a query server computer program 432 for satisfying queries to produce query results and limiting the information contained in the query results to remove any information that the users issuing the queries are not authorized to receive. The memory 430 further contains source data 433, such as database tables, from which to satisfy queries, and a query result limitation table 434 used by the query server to limit the information contained in query results to exclude information that the user submitting the query is not authorized to receive. The memory 430 preferably further includes an operating system 431, such as MICROSOFT® WINDOWS NT®, for providing to other programs access to resources of the computer system.

While the facility is preferably implemented on separate computer systems configured as described above, those skilled in the art will recognize that is may also be implemented on computer systems having different configurations. For example, instead of executing on separate systems, the query client, proxy server, and query servers may be executed on the same system in different combinations. Further, two or more of these programs may be merged in order to provide the same functionality in a smaller total number of programs.

Figure 5:
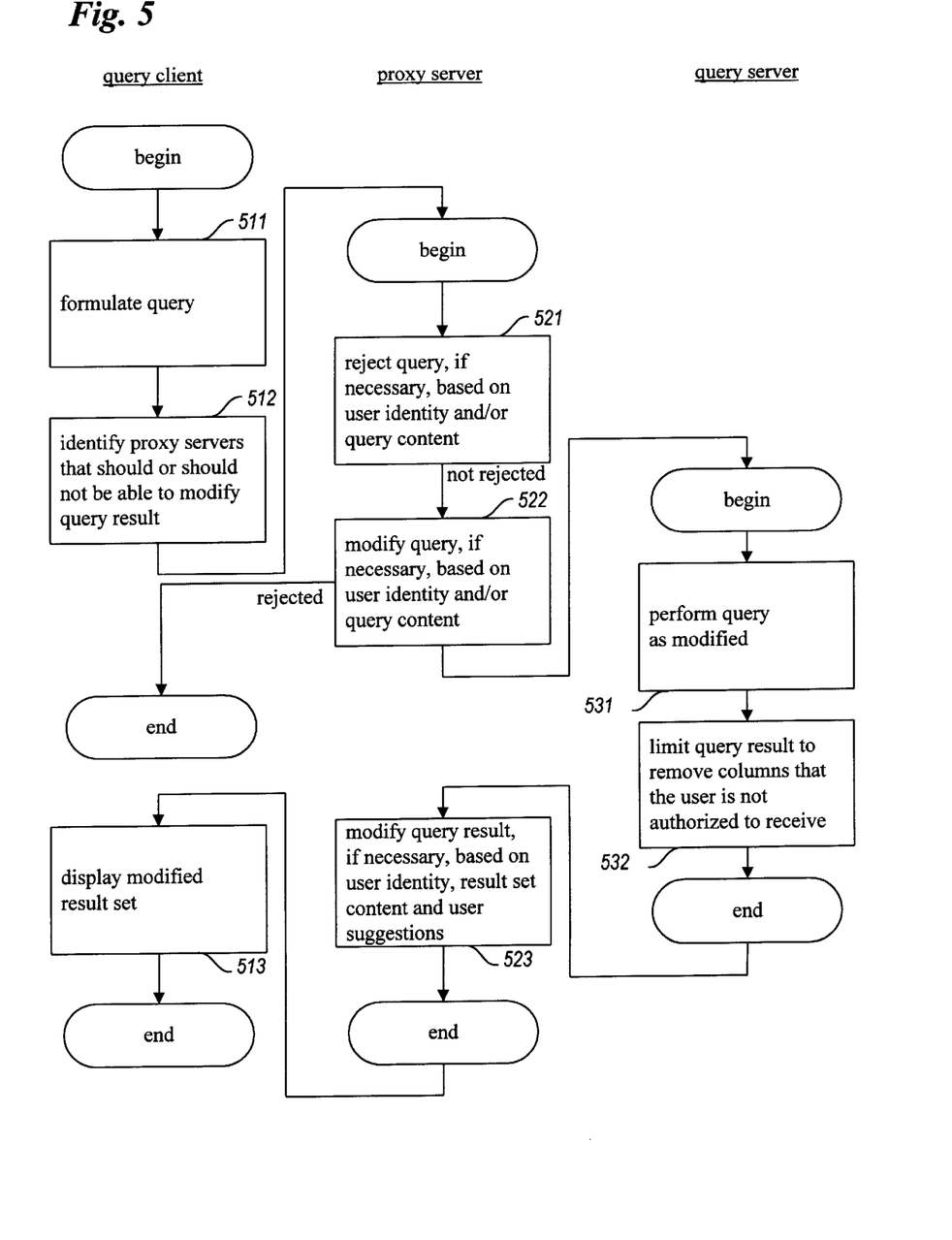
FIG. 5 is an overview flow diagram showing the steps preferably performed by the distributed facility.

FIG. 5 is an overview flow diagram showing the steps preferably performed by the distributed facility. Of steps 511, 512, 513, 521, 522, 523, 531, and 532 shown, steps 511, 512, and 513 are preferably performed in a query client; steps 521, 522, and 523 are preferably performed in a proxy server; and steps 531 and 532 are preferably performed in a query server. In step 511, in the query client, the facility formulates a query. In a preferred embodiment, the facility formulates the query in response to user input from an identified user. In an alternative embodiment, the facility formulates the query automatically, but on behalf of an identified user or a group of users. As a result, the identity of one or more users is associated with the formulated query.

In step 512, the facility identifies any proxy servers that should or should not be able to modify the query result. This information is stored in the query, and is preferably used in an advisory manner by the proxy servers to determine whether they should modify the query result. Proxy servers may, however, preferably be configured to modify the query results even for queries that indicate the proxy server should not be able to modify their query results.

Figure 6:
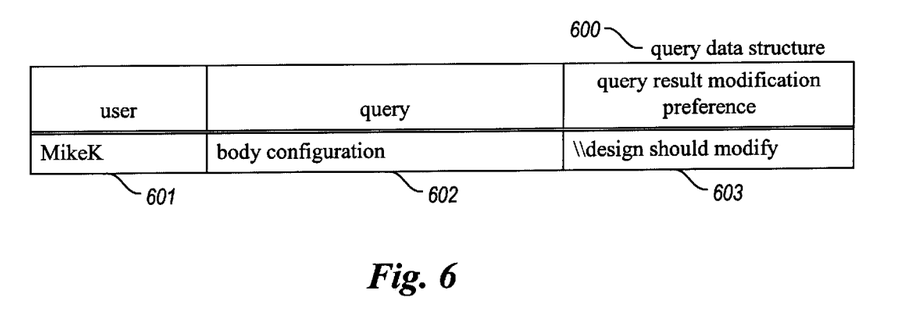
FIG. 6 is a data structure diagram showing a sample query generated in steps 511 and 512.

FIG. 6 is a data structure diagram showing a sample query generated in steps 511 and 512. The query 600 contains an indication 601 of the user that issued the query ("MikeK"), the query itself 602, and an indication that a proxy server called "\\design" should modify the query result.

Returning to FIG. 5, after the facility generates the query in the query client in steps 511 and 512, the generated query is passed to the first upstream proxy server. For example, where the current query is generated in the query client 112 shown in FIG. 1, the generated query is passed to proxy server 110, the first upstream proxy server. In step 521, the current proxy server rejects the query, if necessary, based on the user identity and/or the content of the query. For example, the proxy server may reject the query when issued by a user that does not have the authority to issue queries. The facility may also reject the query when it contains a forbidden search term. In performing steps 521 and 522, the proxy server preferably uses a query modification table that specifies how queries are to be rejected and modified by the proxy server. Each proxy server preferably has its own query modification table.

Figure 7:
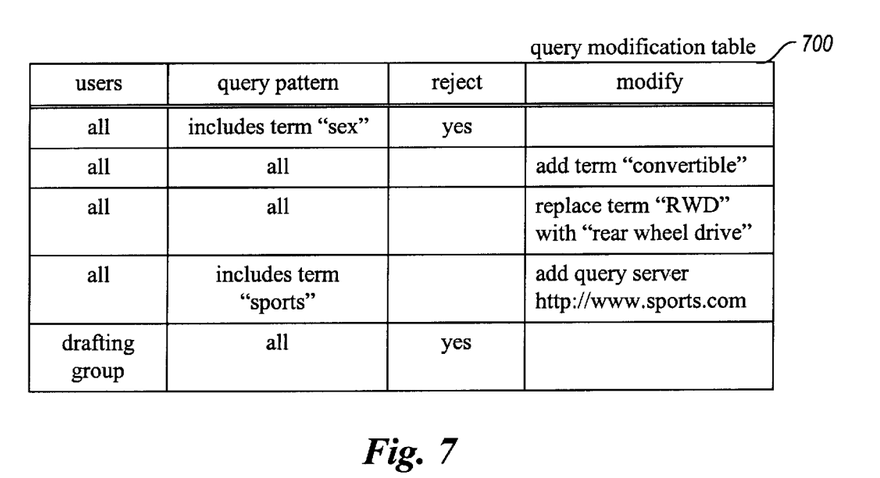
FIG. 7 is a data structure diagram showing a sample query modification table.

FIG. 7 is a data structure diagram showing a sample query modification table. The query modification table 700 has rows each specifying a basis for rejecting or modifying a query in the proxy sever. For example, the first row of the query modification table 700 indicates that, for queries from all users, if the query contains the term "sex," then the query is to be rejected. Further, the fifth row of the query modification table 700 specifies that, for users among the drafting group, all queries are to be rejected.

Returning to FIG. 5, if the proxy sever rejects the query in step 521, then an indication thereof is returned to the query client in these steps conclude without performing the query. If the query is not rejected in step 521, in step 522, the proxy server modifies the query, if necessary, based on the identity of the user and/or the content of the query. For example, the second row of the query modification table 700 indicates that the term "convertible" should be added to every query. The third row of the query modification table 700 indicates that any occurrences of the term "RWD" should be replaced with the term "rear wheel drive." The fourth row of the query modification table 700 indicates that any queries containing the term "sports" should be modified by adding to its list of query servers the query server http://www.sports.com. The tables of at least one layer of proxy servers in the organization, such as the top level proxy server 150 (FIG. 1), preferably add a default server to the list of servers of each of the queries to ensure that at least one query is specified for each query.

Figure 8:
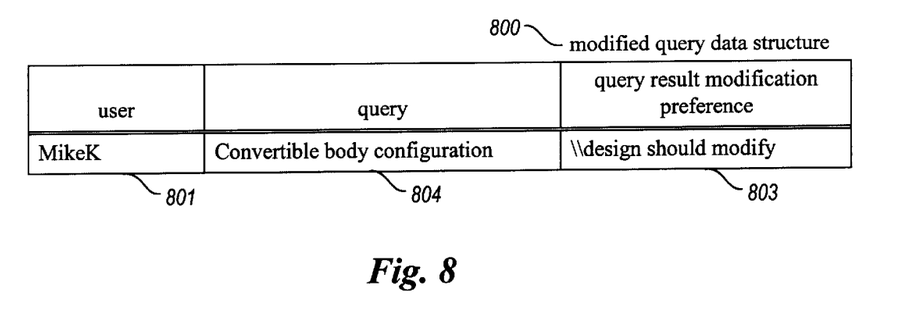
FIG. 8 is a data structure diagram showing a sample query modified in accordance with the sample query modification table 700 shown in FIG. 7.

FIG. 8 is a data structure diagram showing a sample query modified in accordance with the sample query modification table 700 shown in FIG. 7. It can be seen by comparing the modified query data structure 800 to the original query data structure 600 shown in FIG. 6 that the term "convertible" has been added to the modified query data structure 800 in accordance with the second row of the query modification table 700.

Returning to FIG. 5, after step 522, if there are additional upstream proxy servers between the present proxy server and query server, then steps 521 and 522 are performed for each of the intervening proxy servers (not shown). After the query has been modified by the final proxy server, the modified query is passed to the query server.

In step 531, the query server performs the query as modified by each of the proxy servers. In doing so, the query server generates a raw query result that contains all the information requested by the modified query.

Figure 9:
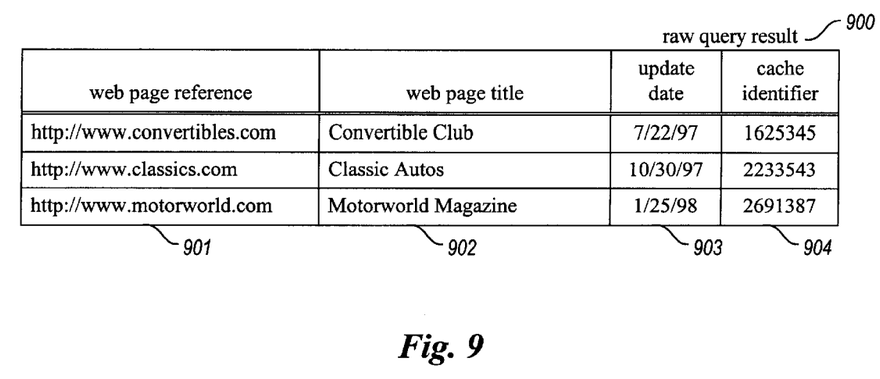
FIG. 9 is a data structure diagram that shows a sample raw query result produced in step 531.

FIG. 9 is a data structure diagram that shows a sample raw query result produced in step 531. The raw query result 900 has four rows, each divided into a number or columns containing a different kind of information about the row: a reference to a web page 901, the title of the web page 902, the date upon which the web page was last updated 903, and a cache identifier 904 that may be used to retrieve the contents of the web page from a cache maintained by the query server.

After generating the raw query result, in step 532, the query server limits the raw query result to remove columns that the user is not authorized to receive. In doing so, the query server utilizes a query result limitation table.

Figure 10:
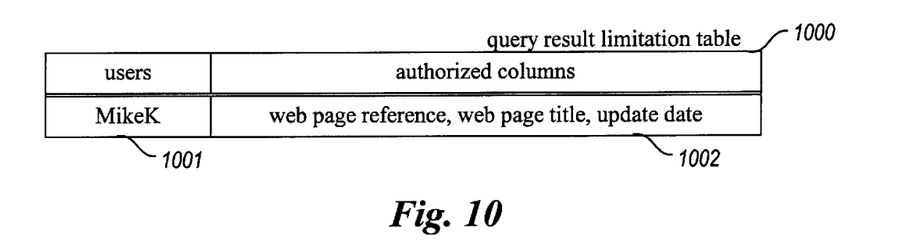
FIG. 10 is a data structure diagram showing a sample query result limitation table.

FIG. 10 is a data structure diagram showing a sample query result limitation table. The query result limitation table identifies, for each user 1001, the set of columns 1002 that users are authorized to receive. The query result limitation table 1000 indicates that the user that issued the sample query, "MikeK," is authorized to receive the web page reference, web page title, and update date columns, and is not eligible to receive the cache identifier column 904 in the raw query result 900. This may be the case where the operators of the query server also operate a web caching service to which the cache identifiers refer, and authorization to receive cache identifiers is restricted by the query server to users of organizations that have paid to use the caching service. Based on these contents of the query result limitation table 1000, the query server generates a limited query result in which the cache identifier column is removed.

Figure 11:
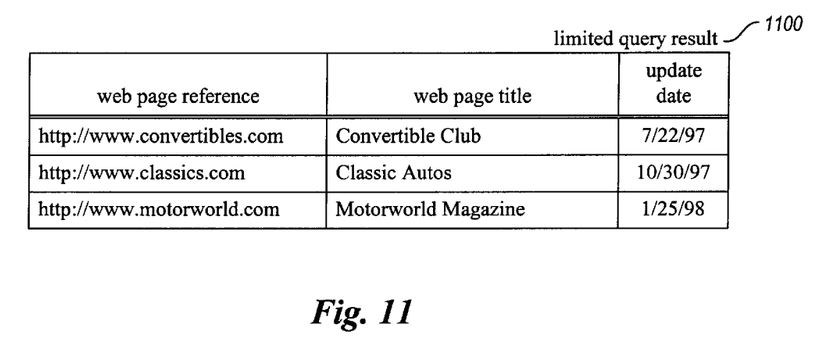
FIG. 11 is a data structure diagram showing a sample limited query result.

FIG. 11 is a data structure diagram showing a sample limited query result. It can be seen by comparing the sample limited query result 1100 to the sample raw query result 900 that the cache identifier column 904 has been removed from the limited query result 1100.

Returning to FIG. 5, after step 532, the query server passes the limited query result back to the first downstream proxy server. In step 523, that proxy server modifies the results, if necessary, based on the identity of the user, the result set content, and any suggestions by the user of which a proxy server should modify the result set. In performing step 523, the proxy server uses a query result modification table.

Figure 12:
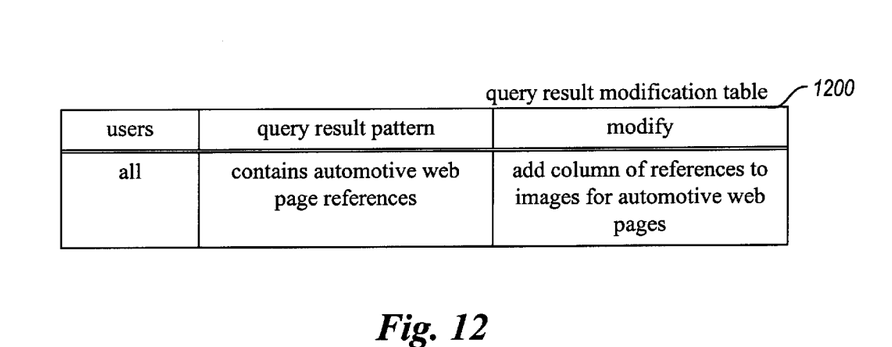
FIG. 12 is a data structure diagram showing a sample query result modification table.

FIG. 12 is a data structure diagram showing a sample query result modification table. The query result modification table 1200 indicates that, for queries issued by all users that contain references to automotive web pages, the proxy server should add a column of references to the query result that reference images mnemonically identify the automotive web pages. In modifying the result set in accordance with step 523, the proxy server generates a modified query result.

Figure 13:
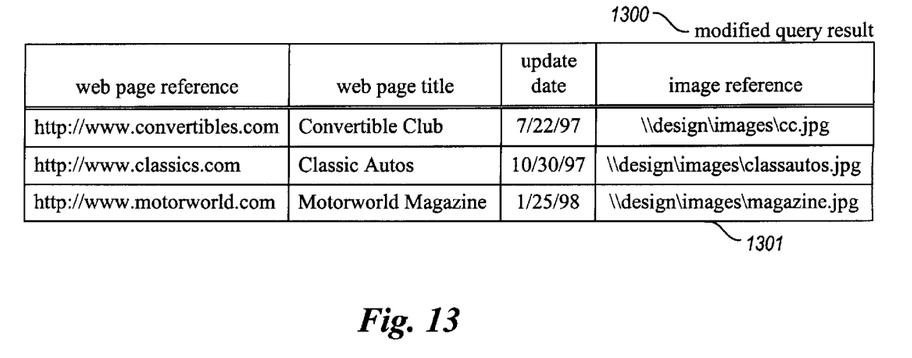
FIG. 13 is a data structure diagram showing a sample modified query result.

FIG. 13 is a data structure diagram showing a sample modified query to result. It can be seen by comparing the modified query result 1300 to the limited query result 1100 that, in accordance with the first row of the query result modification table 1200, the proxy server has added an image reference column 1301 to the limited query result that contains references to images for the web pages referenced in the query result. After step 523, if there are additional downstream proxy servers between the current proxy server and the query client, the current proxy server passes the modified query result to the next downstream proxy server (not shown). In the final downstream proxy server, the facility passes the modified query result back to the query client.

Returning to FIG. 5, after step 523, the first downstream proxy server passes the limited query result back to the query client. In step 513, the query client displays the modified query result. These steps then conclude.

Figure 14:
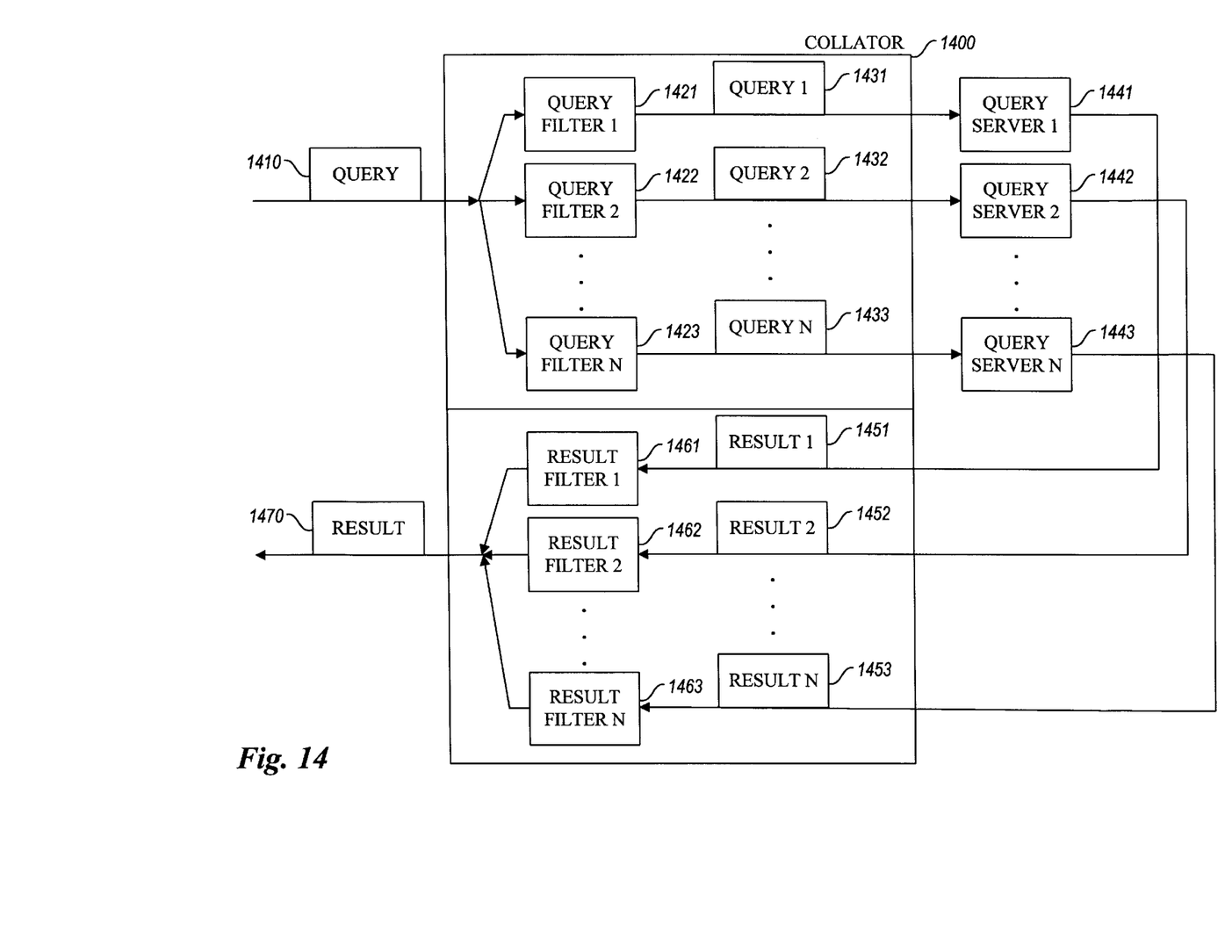
FIG. 14 is a data flow diagram showing the operation of a collator preferably provided by the facility to obtain and combine query results from multiple query servers.

As discussed above, in certain embodiments, the facility distributes a single query to more than one query server, collects results from each of the query servers, and combines them into a master result. FIG. 14 is a data flow diagram showing the operation of a collator preferably provided by the facility to obtain and combine query results from multiple query servers. The collator 1400 directs a single query to multiple query servers, then combines the results returned by the multiple query servers. The query 1410 preferably identifies a number of query servers 1 through N. As discussed above, these identifications of query servers may be attached to the query either by the query client or by proxy servers. The collator 1400 preferably processes the query 1410 through a different query filter for each identified query server. Thus, in order to produce a tailored query 1431 suited to a first query server 1441, the collator applies a first query filter 1421. In order to generate a second tailored query 1432 suited to a second query server 1442, the facility applies a second query filter 1422 to the query 1410, and so on. Each tailored query 1431–1433 is transmitted to the corresponding query server 1441–1443. The query servers each produce a result, such as results 1451–1453. In a manner similar to the individual filtering, the collator applies a different result filter to each of the query server-specific results. For example, to the result 1451 from the first query server, the collator applies a first result filter 1461. To a second result 1452 from the second query server 1452, the collator applies a second result filter 1462, and so on. Finally, the collator combines the processed individual results into a master result 1470, which may be transmitted via the proxy servers to the query client.

While this invention has been shown and described with reference to preferred embodiments, it will be understood by those skilled in the art that various changes or modifications in form and detail may be made without departing from the scope of the invention. For example, the components of the facility may be distributed across computer systems in different configurations. Also, the facility may perform different types of operations on queries and query results than the modification operations discussed herein. Further, the facility may operate on requests for information and supplied information other than formal queries and query results. Additionally, the facility may modify queries without modifying query results, or may modify query results without modifying queries.

What is claimed is:

1. A method in a computer system for managing a database query, the method comprising the steps of:
   in a query client computer program, generating a query specifying database information to be retrieved, said query including a set of one or more search terms;
   transmitting the generated query from the query client to a proxy server computer program;
   in the proxy server,
      determining, based on standards maintained by the proxy server, whether to reject the query;
      if it is determined not to reject the query,
         determining, based on standards maintained by the proxy server, whether to modify the query;
      if it is determined to modify the query,
         modifying the query, including modifying the set of search terms included in said query;
         forwarding the modified query for satisfaction; and
      if it is determined not to modify the query,
         forwarding the unmodified query for satisfaction.

2. The method of claim 1 wherein the modifying step deletes from the query one or more selected search terms in accordance with standards maintained by the proxy server.

3. The method of claim 1 wherein the modifying step adds to the query one or more selected search terms in accordance with standards maintained by the proxy server.

4. The method of claim 1 wherein the modifying step replaces in the query one or more selected replaced search terms with one or more selected substitute search terms in accordance with standards maintained by the proxy server.

5. The method of claim 1 wherein the proxy server determines to reject the query based on the search term contained in the query.

6. A method in a computer system for managing a database query, the method comprising the steps of:
   in a query client computer program, generating a query specifying database information to be retrieved wherein the query contains an identification of one or more query servers to which the query may be forwarded for satisfaction;
   transmitting the generated query from the query client to a proxy server computer program;
   in the proxy server,
      determining, based on standards maintained by the proxy server, whether to reject the query;
      if it is determined not to reject the query,
         determining, based on standards maintained by the proxy server, whether to modify the query;
      if it is determined to modify the query,
         modifying the query wherein the modifying step deletes from the query one or more selected identified query servers in accordance with standards maintained by the proxy server;
         forwarding the modified query for satisfaction; and
      if it is determined not to modify the query,
         forwarding the unmodified query for satisfaction.

7. A method in a computer system for managing a database query, the method comprising the steps of:
   in a query client computer program, generating a query specifying database information to be retrieved wherein the query contains an identification of one or more query servers to which the query may be forwarded for satisfaction;
   transmitting the generated query from the query client to a proxy server computer program;
   in the proxy server,
      determining, based on standards maintained by the proxy server, whether to reject the query;
      if it is determined not to reject the query,
         determining, based on standards maintained by the proxy server, whether to modify the query;
      if it is determined to modify the query,
         modifying the query wherein the modifying step adds to the query one or more identifications of selected query servers in accordance with standards maintained by the proxy server;
         forwarding the modified query for satisfaction; and if it is determined not to modify the query,
   forwarding the unmodified query for satisfaction.

8. A method in a computer system for managing a database query, the method comprising the steps of:
- in a query client computer program, generating a query specifying database information to be retrieved wherein the query contains an identification of a plurality of query servers to which the query may be delivered for satisfaction;
- transmitting the generated query from the query client to a proxy server computer program;
- in the proxy server,
  - determining, based on standards maintained by the proxy server, whether to reject the query;
  - if it is determined not to reject the query,
    - determining, based on standards maintained by the proxy server, whether to modify the query;
    - if it is determined to modify the query,
      - modifying the query wherein the modifying step replaces in the query one or more selected identifications of query servers with one or more selected identifications of substitute query servers in accordance with standards maintained by the proxy server;
      - forwarding the modified query for satisfaction; and
    - if it is determined not to modify the query,
      - forwarding the unmodified query for satisfaction.

9. A method in a computer system for managing a database query, the method comprising the steps of:
- in a query client computer program, generating a query specifying database information to be retrieved, wherein the query generated in the client is generated by an identified user;
- transmitting the generated query from the query client to a proxy server computer program;
- in the proxy server,
  - determining, based on standards maintained by the proxy server, whether to reject the query, wherein the proxy server determines to reject the query based on the identity of the identified user;
  - if it is determined not to reject the query,
    - determining, based on standards maintained by the proxy server, whether to modify the query;
    - if it is determined to modify the query,
      - modifying the query;
      - forwarding the modified query for satisfaction; and
    - if it is determined not to modify the query,
      - forwarding the unmodified query for satisfaction.

10. A method in a computer system for managing a database query, the method comprising the steps of:
- in a query client computer program, generating a query specifying database information to be retrieved;
- transmitting the generated query from the query client to a proxy server computer program;
- in the proxy server,
  - determining, based on standards maintained by the proxy server, whether to reject the query;
  - if it is determined not to reject the query,
    - determining, based on standards maintained by the proxy server, whether to modify the query;
    - if it is determined to modify the query,
      - modifying the query;
      - forwarding the modified query for satisfaction; and
    - if it is determined not to modify the query,
      - forwarding the unmodified query for satisfaction wherein the forwarding steps of the proxy server forward the query to a second proxy server computer program, the method further comprising the steps of, in the second proxy server:
        - determining, based on standards maintained by the second proxy server, whether to reject the query;
        - if it is determined not to reject the query,
          - determining, based on standards maintained by the second proxy server, whether to modify the query;
          - if it is determined to modify the query,
            - modifying the query;
            - forwarding the modified query for satisfaction; and
          - if it is determined not to modify the query,
            - forwarding the unmodified query for satisfaction.

11. A method in a computer system for managing a database query, the method comprising the steps of:
- in a query client computer program, generating a query specifying database information to be retrieved;
- transmitting the generated query from the query client to a proxy server computer program;
- in the proxy server,
  - determining, based on standards maintained by the proxy server, whether to reject the query;
  - if it is determined not to reject the query,
    - determining, based on standards maintained by the proxy server, whether to modify the query;
    - if it is determined to modify the query,
      - modifying the query;
      - forwarding the modified query for satisfaction; and
    - if it is determined not to modify the query,
      - forwarding the unmodified query for satisfaction wherein the forwarding steps forward the query to a plurality of query server computer programs, said method further comprising the steps of:
- in each of the query servers, consulting a database in order to generate a query result satisfying the query; and
- assembling the query results from the query servers into a master query result.

12. A method in a computer system for managing a database query, the method comprising the steps of:
- in a query client computer program, generating a query specifying database information to be retrieved wherein the query generated in the client is generated by an identified user;
- transmitting the generated query from the query client to a proxy server computer program;
- in the proxy server,
  - determining, based on standards maintained by the proxy server, whether to reject the query;
  - if it is determined not to reject the query,
    - determining, based on standards maintained by the proxy server, whether to modify the query;
    - if it is determined to modify the query,
      - modifying the query;
      - forwarding the modified query for satisfaction; and
    - if it is determined not to modify the query,
      - forwarding the unmodified query for satisfaction;
- wherein the forwarding steps forward the query to a query server computer program, further comprising the step of, in the query server, consulting a database in order to generate a query result satisfying the query,
- wherein the step of generating a query result generates a query result having columns each corresponding to a different data attribute, and wherein the identified user has a security rating reflecting columns that the identified user is qualified to receive, said method further comprising the steps of, in the query server:

identifying any columns among those of the generated query result that the identified user is not qualified to received based on the security rating of the identified user;

deleting any identified columns; and after the deleting step, transmitting the query result to the query client.

13. A computer-readable medium whose contents cause one or more computer systems to manage a database query by performing the steps of:

in a query client computer program, generating a query specifying database information to be retrieved;

transmitting the generated query from the query client to a proxy server computer program;

in the proxy server, determining, based on standards maintained by the proxy server, whether to modify the query;

if it is determined to modify the query, modifying the query;

forwarding the modified query for satisfaction; and if it is determined not to modify the query, forwarding the unmodified query for satisfaction;

wherein the forwarding steps of the proxy server forward the query to a second proxy server computer program, and wherein the contents of the computer-readable medium further cause the computer systems to perform the steps of, in the second proxy server:

determining, based on standards maintained by the second proxy server, whether to modify the query;

if it is determined to modify the query, modifying the query;

forwarding the modified query for satisfaction; and if it is determined not to modify the query, forwarding the unmodified query for satisfaction.

14. A computer-readable medium whose contents cause one or more computer systems to manage a database query by performing the steps of;

in a query client computer program, generating a query specifying database information to be retrieved wherein the query generated in the client is generated by an identified user;

transmitting the generated query from the query client to a proxy server computer program;

in the proxy server, determining, based on standards maintained by the proxy server, whether to modify the query;

if it is determined to modify the query, modifying the query;

forwarding the modified query for satisfaction; and if it is determined not to modify the query, forwarding the unmodified query for satisfaction;

wherein the forwarding steps forward the query to a query server computer program, and wherein the contents of the computer-readable medium further cause the computer systems to perform the step of, in the query server, consulting a database in order to generate a query result satisfying the query wherein the step of generating a query result generates a query result having columns each corresponding to a different data attribute, and wherein the identified user has a security rating reflecting columns that the identified user is qualified to receive, and wherein the contents of the computer-readable medium further cause the computer systems to perform the steps of, in the query server:

identifying any columns among those of the generated query result that the identified user is not qualified to received based on the security rating of the identified user;

deleting any identified columns; and after the deleting step, transmitting the query result to the query client.

15. A method in a computer system for managing a database query result, the method comprising the steps of:

in a proxy server computer program, determining, based on standards maintained by the proxy server, whether to modify the query result, said query result having been produced in satisfaction of a query generated by a user, wherein the determination is based at least in part on the identity of the user who generated the query;

if it is determined to modify the query result, modifying the query result;

returning the modified query result to a query client computer program;

if it is determined not to modify the query result, returning the unmodified query result to the query client; and in the query client, presenting the query result returned by the proxy server.

16. The method of claim 15, wherein a security rating is associated with the user who generated the query, and wherein the determination as to whether to modify the query is based at least in part on said security rating.

17. The method of claim 15, wherein said query result is organized into columns, and wherein said modifying step includes deleting at least one of said columns based on the identity of the user who generated the query.

18. The method of claim 15, wherein a security rating is associated with said user, and wherein said modifying step includes deleting at least one of said columns based on the security rating.

19. A method in a computer system for tailoring an information retrieval query issued by a user based upon the position of that user within an organization of users, the method comprising the steps of:

in a query client, generating an information retrieval query on behalf of an identified user, the identified user being a member both of a first logical subset of the organization and of a second logical subset of the organization;

in a first proxy server corresponding to the first logical subset of the organization, modifying the generated query based upon query modification criteria specified for members of the first logical subset;

in a second proxy server corresponding to the second logical subset of the organization, modifying the generated query based upon query modification criteria specified for members of the second logical subset; and processing the query as modified by the first and second proxy servers to retrieve information responsive to the modified query.

20. The method of claim 19 wherein the second logical subset is a proper superset of the first logical subset.

21. The method of claim 19 wherein the processing step excludes from the retrieved information information whose access by the identified user is prohibited.

22. The method of claim 19, further comprising the steps of:

in the second proxy server, modifying the retrieved information based upon query result modification criteria specified for members of the second logical subset;

in the first proxy server, modifying the retrieved information based upon query result modification criteria specified for members of the first logical subset; and in the query client, presenting the retrieved information as modified by the first and second proxy servers.

23. A computer-readable medium whose contents cause one more computer systems to tailor an information retrieval query issued by a user based upon the position of that user within an organization of users by performing the steps of:

generating an information retrieval query on behalf of an identified user, the identified user being a member both of a first logical subset of the organization and of a second logical subset of the organization;

in a first proxy server corresponding to the first logical subset of the organization, modifying the generated query based upon query modification criteria specified for members of the first logical subset;

in a second proxy server corresponding to the second logical subset of the organization, modifying the generated query based upon query modification criteria specified for members of the second logical subset; and processing the query as modified by the first and second proxy servers to retrieve information responsive to the modified query.

24. The computer-readable medium of claim 23 wherein the second logical subset is a proper superset of the first logical subset.

25. The computer-readable medium of claim 23 wherein the processing step excludes from the retrieved information information whose access by the identified user is prohibited.

26. The computer-readable medium of claim 23 wherein the contents of the computer-readable medium further cause the computer systems to perform the steps of:

in the second proxy server, modifying the retrieved information based upon query result modification criteria specified for members of the second logical subset;

in the first proxy server, modifying the retrieved information based upon query result modification criteria specified for members of the first logical subset; and presenting the retrieved information as modified by the first and second proxy servers.

27. One or more computer memories that collectively contain a query management data structure for managing queries issued originating within particular subsets of an organization, the data structure comprising:

for each of a plurality of subsets of the organization, information specifying how queries originating within the subset are to be modified, such that, when a query is originated in the organization, the data structure may be used to modify the query in a manner consistent with the identity of the subsets of the organization in which the query is originated.

28. The computer memories of claim 27 wherein the information specifying how queries originating within the subset are to be modified does so for each of a plurality of query patterns.

29. The computer memories of claim 27 wherein the information specifying how queries originating within the subset are to be modified specifies how lists of query servers specified in queries originating within the subset are to be modified.

30. The computer memories of claim 27 wherein the data structure further comprises:

for each of the plurality of subsets of the organization, information specifying how query results for queries originating within the subset are to be modified, such that, when a query result is generated for a query originated in the organization, the data structure may be used to modify the query result in a manner consistent with the identity of the subsets of the organization in which the query is originated.

31. A computer memory containing a modified database query data structure representing a database query submitted by a user that is a member of the organization, the query having been modified to reflect the position of the user within the organization, the data structure comprising:

a first set of search terms produced by automatically modifying a second set of search terms submitted by the user in a manner that reflects the position of the user within the organization, such that, in response to the submission by the user of a query containing the second set of search terms, the first set of search terms contained in the data structure may be used to produce a query result based upon the query that reflects the position of the user within the organization.

32. A system for query processing comprising:

a first computer system having a first central processing unit, a first memory, and a first network connection for sending and receiving information to and from other computer systems, said first memory containing first programming executable on said first central processing unit whereby said first computer system generates queries based on user control and sends said queries over said network connection;

a second computer system having a second central processing unit, a second memory, and a second network connection for sending and receiving information to and from other computer systems, said second memory containing second programming executable on said second central processing unit whereby said second computer system: receives queries from said first computer system by way of said second network connection; modifies said queries; and sends the modified queries over said network connection; and a third computer system having a third central processing unit, a third memory, and a third network connection for sending and receiving information to and from other computer systems, said third computer system being in communication with a database, said third memory containing third programming executable on said third central processing unit whereby said third computer system: retrieves information from said database based on the modified queries and removes at least some of the retrieved information to produce results; and sends said results over said third network connection to said second computer system.

33. The system of claim 32, wherein said second memory further contains a query modification table, and wherein said second computer system, by way of said second programming, modifies said queries based on said query modification table.

34. The system of claim 32, wherein said third memory further contains a query result limitation table, and wherein said third computer system, by way of said third programming, removes at least some retrieved information based on said query result limitation table.

35. The system of claim 34, wherein said query result limitation table specifies which columns in the information retrieved from said database should be included in said results.

36. The system of claim 32, wherein said second computer system, by way of said second programming, further:

receives said result from said third computer system by way of said second network connection;

modifies said results; and sends said second results to said first computer system over said second network connection.

37. The system of claim 36, wherein said queries contain indications of which proxy servers may or may not modify the results of said queries, and said second programming conditions the modification of said results upon said indications.

38. The system of claim 32, wherein said second memory further contains a query result modification table, and wherein said second computer system, by way of said second programming, modifies said result based on said query result modification table.

39. The system of claim 32, wherein modification of said queries includes adding a database to the set of databases to be searched to satisfy said queries.

40. The system of claim 32, wherein modification of said queries includes adding search terms to said queries.

41. The system of claim 32, wherein said third memory further contains firewall programming executable on said third central processing unit, said firewall programming controlling the passage of information over said network connection.

42. A system for modifying queries and query results comprising:

a computer system having a central processing unit, a memory, and a network connection;

a first portion of said memory for storing query modification information;

a second portion of said memory for storing query-result modification information; and proxy server programming stored in said memory and executable on said central processing unit whereby said computer system: receives a query from a query client by way of said network connection; modifies said query based on the contents of said first portion of said memory; sends said query to a query server by way of said network connection; receives a query result from said query server by way of said network connection; modifies said query result based on the contents of said second portion of said memory; and sends said query result to said query client by way of said network connection.

43. The system of claim 42, wherein said query modification information comprises a list of search terms to be added to said query.

44. The system of claim 42, wherein said query modification information comprises a list of databases to be added to the set of databases to be searched to satisfy said query.

45. The system of claim 42, wherein said query-result modification information comprises information to be added to said query result.

46. A query-processing system operating on one or more computer systems, each of said computer systems having a central processing unit and a memory, said system comprising:

a query modification table loaded into the memory of one of said computer systems;

a query-result modification table loaded into the memory of one of said computer systems;

a query-result limitation table loaded into the memory of one of said computer systems;

query client programming loaded into the memory of one of said computer systems and executable on the central processing unit of the computer system into whose memory said query client programming is loaded, whereby the computer system onto which said query client programming is loaded: generates queries based on control by a user; forwards said queries for modification; receives a modified result; and displays said result to said user;

proxy server programming loaded into the memory of one of said computer systems and executable on the central processing unit of the computer system into whose memory said proxy server programming is loaded, whereby the computer system onto which said proxy server programming is loaded: receives said forwarded queries; modifies said forwarded queries based on said query modification table; forwards the modified queries for satisfaction; receives the result of said satisfaction; modifies said result based on said query-result modification table; and forwards the modified result for display by said query client programming; and query server programming loaded into the memory of one of said computer systems and executable on the central processing unit of the computer system onto which said query server programming is loaded, whereby said query server programming: provides access to a database; satisfies said modified query by retrieving information from said database; removes at least some of the retrieved information based on said query-result limitation table to produce a result; and forwards said result for modification by said proxy server programming.

47. The system of claim 46, wherein at least two of the following are loaded onto a single one of said computer systems: said query client programming, said proxy server programming, and said query server programming.

48. The system of claim 46, wherein at least two of the following are merged into a single computer program: said query client programming, said proxy server programming, and said query server programming.

* * * * *